(12) United States Patent
Racca (10) Patent No.: US 10,570,759 B2
(45) Date of Patent: Feb. 25, 2020

(54) VARIABLE-GEOMETRY TURBINE HOUSING INTAKE CHANNEL FOR AN EXHAUST DRIVEN TURBOCHARGER

(71) Applicant: GM GLOBAL TECHNOLOGY OPERATIONS LLC, Detroit, MI (US)

(72) Inventor: Alberto Racca, Cavallermaggiore (IT)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 15/645,695

(22) Filed: Jul. 10, 2017

(65) Prior Publication Data
US 2019/0010814 A1 Jan. 10, 2019

(51) Int. Cl.
| | |
|---|---|
| F01D 7/00 | (2006.01) |
| F01D 5/04 | (2006.01) |
| F01D 25/24 | (2006.01) |
| F02C 6/12 | (2006.01) |
| F01D 17/14 | (2006.01) |
| F02B 37/24 | (2006.01) |

(52) U.S. Cl.
CPC .............. *F01D 7/00* (2013.01); *F01D 5/048* (2013.01); *F01D 17/143* (2013.01); *F01D 25/24* (2013.01); *F02C 6/12* (2013.01); *F02B 37/24* (2013.01); *F05D 2220/40* (2013.01); *F05D 2260/70* (2013.01)

(58) Field of Classification Search
CPC ........ F01D 5/048; F01D 17/143; F01D 25/24; F02C 6/12; F02B 37/24
See application file for complete search history.

(56) References Cited

U.S. PATENT DOCUMENTS

| | | | | |
|---|---|---|---|---|
| 5,231,831 | A * | 8/1993 | Leavesley | F01D 17/143 60/602 |
| 2011/0072815 | A1* | 3/2011 | Pesiridis | F01D 17/141 60/615 |

* cited by examiner

*Primary Examiner* — Ngoc T Nguyen
(74) *Attorney, Agent, or Firm* — Quinn IP Law (57) ABSTRACT

A variable-geometry turbocharger (VGT) for an internal combustion engine configured to generate a flow of post-combustion gases as a byproduct of generating output torque includes a turbine housing defining a volute. The VGT also includes a turbine wheel mounted on a shaft having a rotational axis, retained inside the turbine housing, and configured to be rotated about the rotational axis by the flow of post-combustion gases. The turbine housing defines an inlet to the turbine wheel downstream of the volute and upstream of the turbine wheel. The inlet to the turbine wheel includes a circumferentially continuous and unobstructed intake channel having a selectable cross-sectional area and configured to regulate effective expansion ratio of the VGT. An internal combustion engine employing such a VGT is also disclosed.

14 Claims, 6 Drawing Sheets

VARIABLE-GEOMETRY TURBINE HOUSING INTAKE CHANNEL FOR AN EXHAUST DRIVEN TURBOCHARGER

INTRODUCTION

The present disclosure relates to a variable-geometry turbine housing intake channel for an exhaust driven turbocharger for an internal combustion engine (ICE).

ICEs are often called upon to generate considerable levels of power for prolonged periods of time on a dependable basis. Many such ICE assemblies employ a boosting device, such as an exhaust gas driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more torque and power.

A variable-geometry turbocharger (VGT) is a type of a turbocharger usually designed to allow the effective expansion ratio (E:R) of the turbocharger to be altered in line with engine speed, and thus facilitate increased ICE operating efficiency. Turbochargers using moveable vanes are the most common type of VGTs. VGTs using moveable vanes tend to be more common on compression ignition or diesel ICE's, as compared to spark ignition engines, because lower exhaust temperatures of diesel engines provide a less extreme environment for such VGTs' movable vanes and other sensitive, dimensionally precise components.

SUMMARY

A variable-geometry turbocharger (VGT) for an internal combustion engine configured to generate a flow of post-combustion gases as a byproduct of generating output torque includes a turbine housing defining a volute. The VGT also includes a turbine wheel mounted on a shaft having a rotational axis, retained inside the turbine housing, and configured to be rotated about the rotational axis by the flow of post-combustion gases. The turbine housing defines an inlet to the turbine wheel downstream of the volute and upstream of the turbine wheel. The inlet to the turbine wheel includes a circumferentially continuous and unobstructed intake channel having a selectable cross-sectional area and configured to regulate effective expansion ratio of the VGT.

The VGT may also include a mechanism configured to select the cross-sectional area of the intake channel and includes a ring defined by an outer diameter surface and moveably mounted to the turbine housing in the intake channel to thereby define a moveable back wall of the intake channel.

The ring may be moveably mounted to the turbine housing in the intake channel via a precision fit and configured to slide along the rotating axis to thereby select the cross-sectional area of the intake channel.

The ring may be in threaded engagement with the turbine housing and configured to simultaneously rotate and translate relative to the turbine housing to thereby select the cross-section of the intake channel.

The turbine housing and the ring may have comparable coefficients of thermal expansion.

The VGT may also include a bearing housing having at least one bearing configured to support the shaft. In such a case, the ring may be mounted between the bearing housing and the turbine wheel when viewed along the rotational axis.

The volute of the turbine housing may include an internal cylindrical wall defined by a diameter, and the outer diameter surface of the surface may match the diameter of the internal cylindrical wall.

The outer diameter surface of the ring may have one of a rounded and a beveled edge configured to receive the flow of post-combustion gases from the volute and reduce turbulence in the flow of post-combustion gases.

The mechanism may additionally include an actuator configured to selectively vary a position of the ring relative to the turbine housing.

The mechanism may be configured to vary the position of the ring in a continuous and step-less motion.

The actuator may have either an electro-mechanical or a pneumatic configuration.

The mechanism may additionally include a controller having a memory and configured to regulate the actuator.

Another embodiment of the invention is directed to an internal combustion engine that employs the VGT as described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
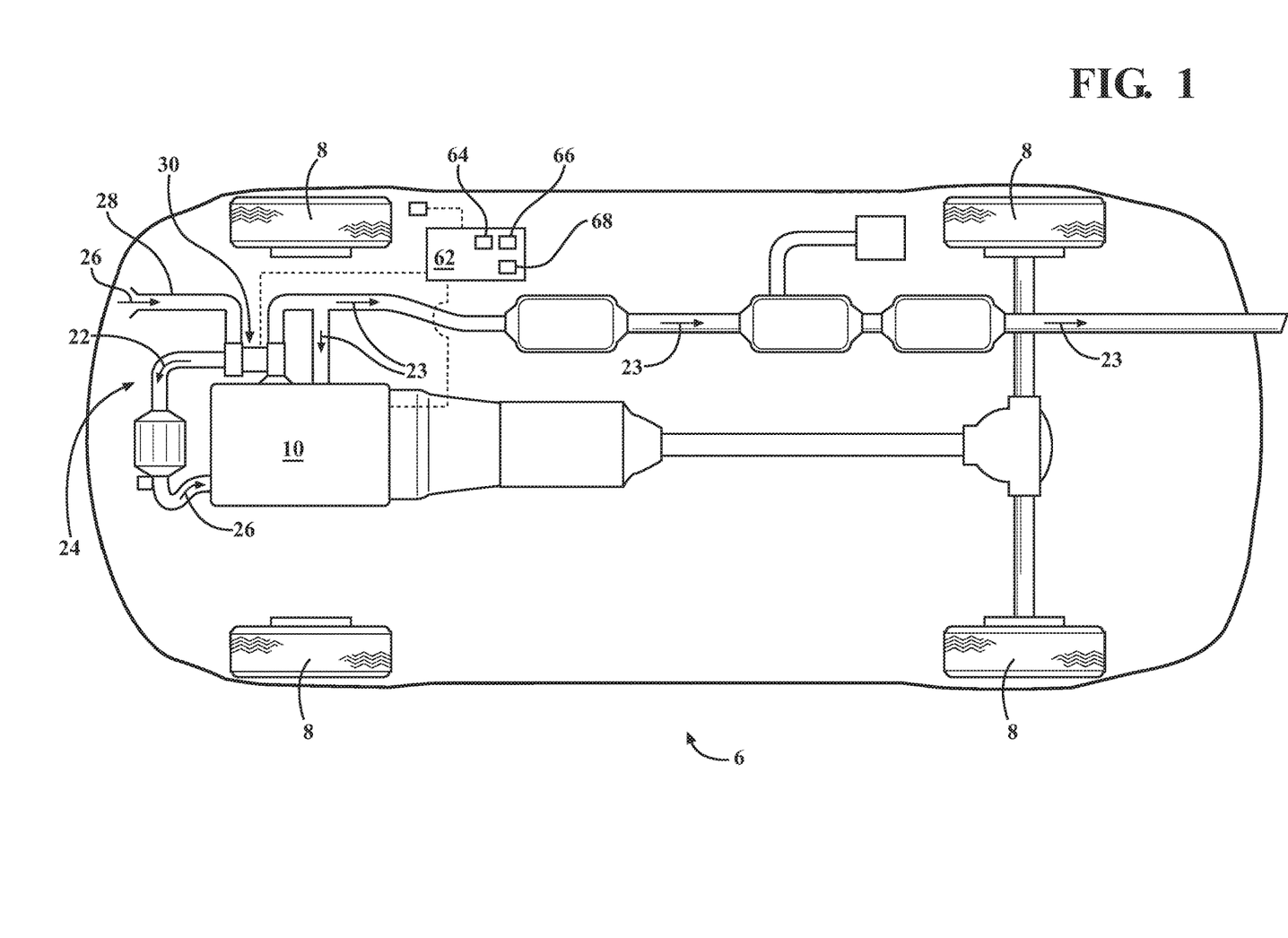
FIG. 1 is a schematic illustration of a vehicle including an internal combustion engine that has a variable geometry turbocharger (VGT) according to the disclosure.
Figure 2:
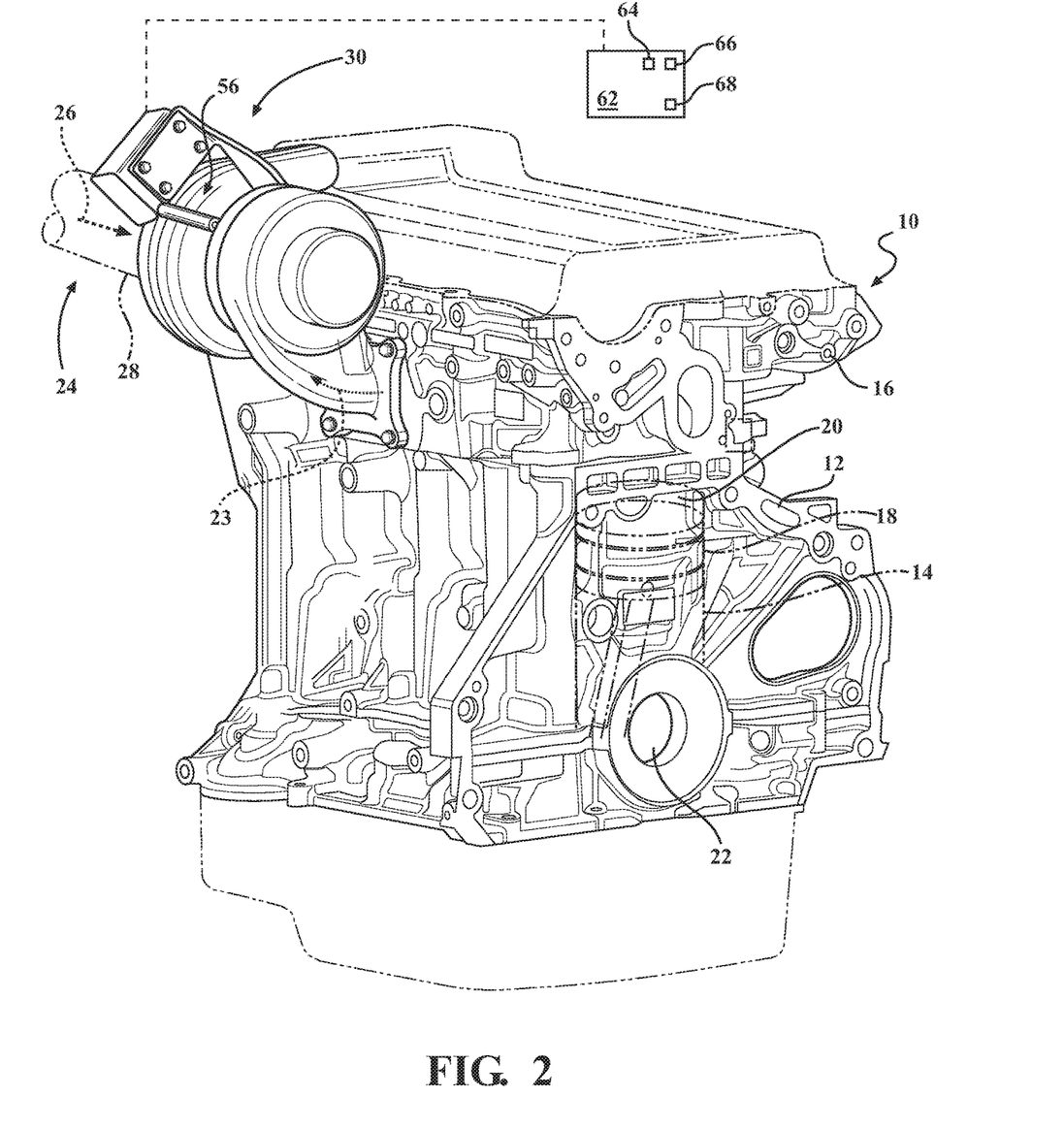
FIG. 2 is a schematic perspective close-up view of the engine shown in FIG. 1.

Referring to the drawings wherein like reference numbers correspond to like or similar components throughout the several figures, FIG. 1 illustrates a vehicle 6 having a plurality of wheels 8 that may be driven by an internal combustion engine (ICE) 10. As shown in FIG. 2, the ICE 10 includes a cylinder block 12 with a plurality of cylinders 14 arranged therein. The ICE 10 also includes a cylinder head 16. Each cylinder 14 includes a piston 18 configured to reciprocate therein. The ICE 10 may be a spark ignition or a compression ignition design. The ICE 10 generates post-combustion gases as a by-product of generating engine output torque.

As shown in FIG. 2, combustion chambers 20 are formed within the cylinders 14 between the bottom surface of the cylinder head 16 and the tops of the pistons 18. As known by those skilled in the art, combustion chambers 20 are configured to receive fuel and air such that a fuel-air mixture may form for subsequent combustion therein. The ICE 10 also includes a crankshaft 22 configured to rotate within the cylinder block 12. The crankshaft 22 is rotated by the pistons 18 as a result of increased pressure from the burning fuel-air mixture in the combustion chambers 20. After the air-fuel mixture is burned inside a specific combustion chamber 20, the reciprocating motion of a particular piston 18 serves to generate a flow of post-combustion or exhaust gases 23 from the respective cylinder 14.

The ICE 10 also includes an induction system 24 configured to channel an airflow 26 from the ambient to the cylinders 14. The induction system 24 includes an intake air duct 28, a variable geometry turbocharger (VGT) 30, and an intake manifold (not shown). Although not shown, the induction system 24 may additionally include an air filter upstream of the VGT 30 for removing foreign particles and other airborne debris from the airflow 26. The intake air duct 28 is configured to channel the airflow 26 from the ambient to the VGT 30, while the VGT is configured to pressurize the received airflow, and discharge the pressurized airflow to the intake manifold. The intake manifold in turn distributes the previously pressurized airflow 26 to the cylinders 14 for mixing with an appropriate amount of fuel and subsequent combustion of the resultant fuel-air mixture.

Figure 3:
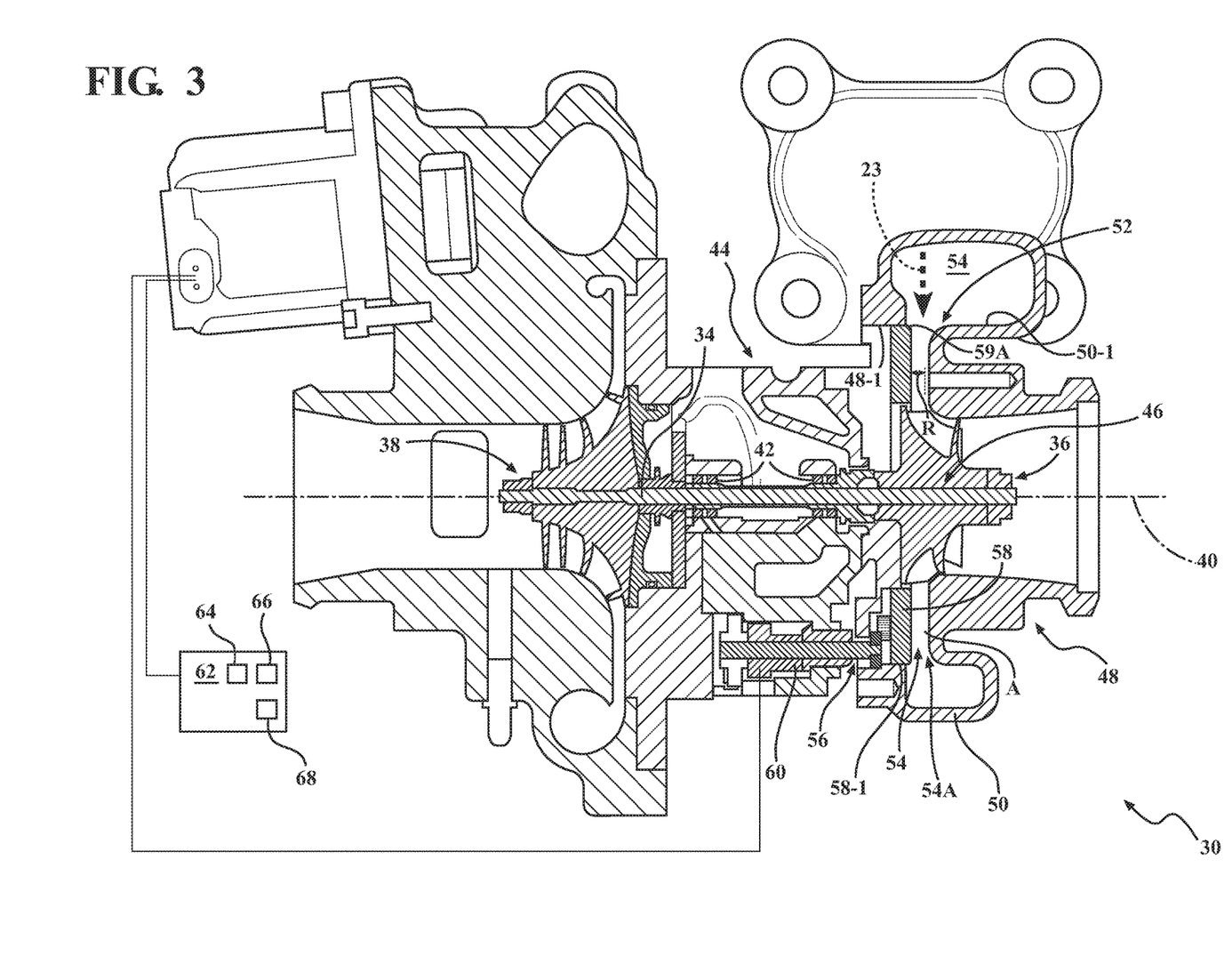
FIG. 3 is a schematic cross-sectional side view of the VGT shown in FIGS. 1 and 2, including one embodiment of a mechanism having a ring configured to select a cross-sectional area of an intake channel, and depicting the ring in an intermediate position.
Figure 4:
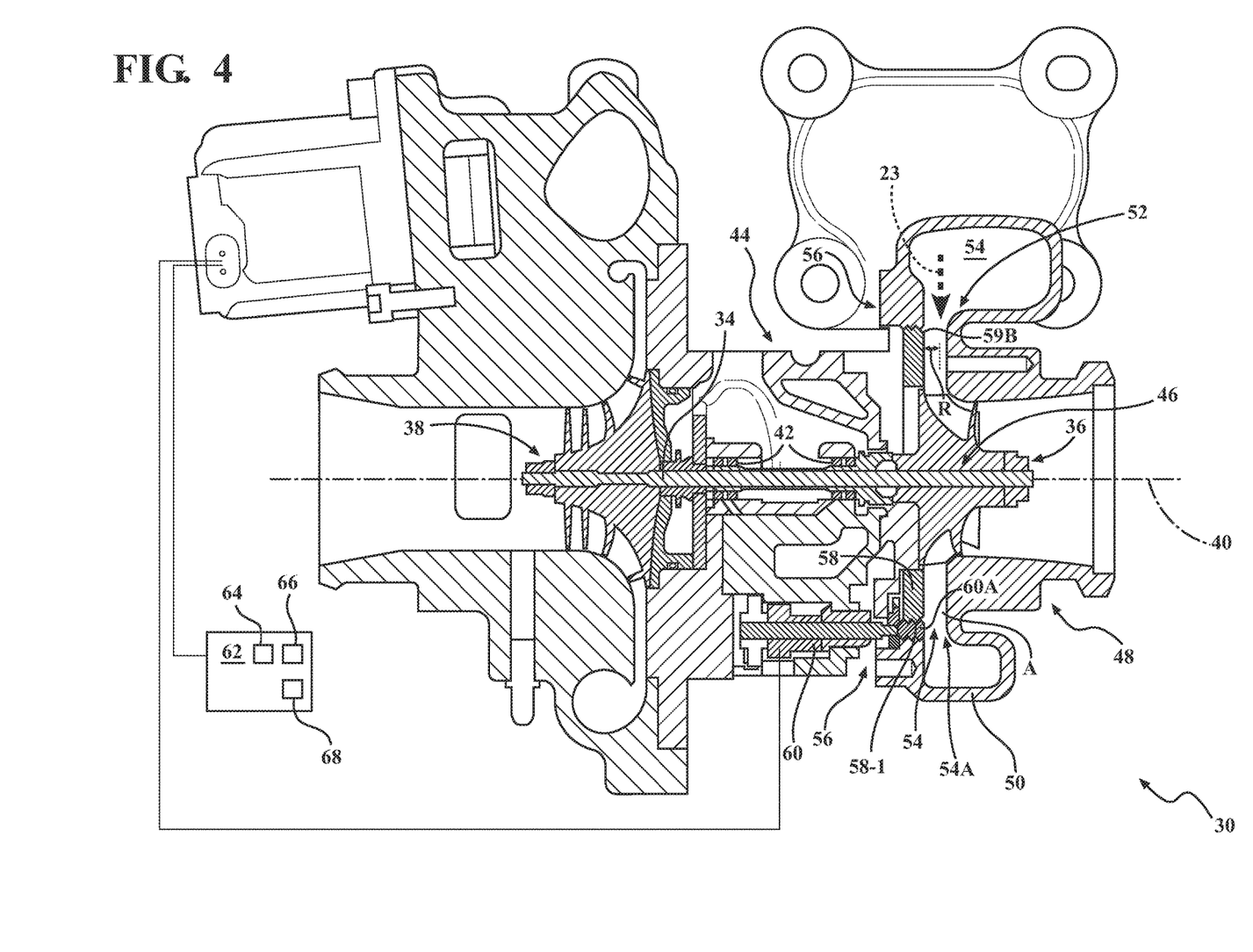
FIG. 4 is a schematic cross-sectional side view of the VGT shown in FIGS. 1 and 2, including another embodiment of a mechanism having a ring configured to select the cross-sectional area of the intake channel, and depicting the ring in a fully retracted position.
Figure 5:
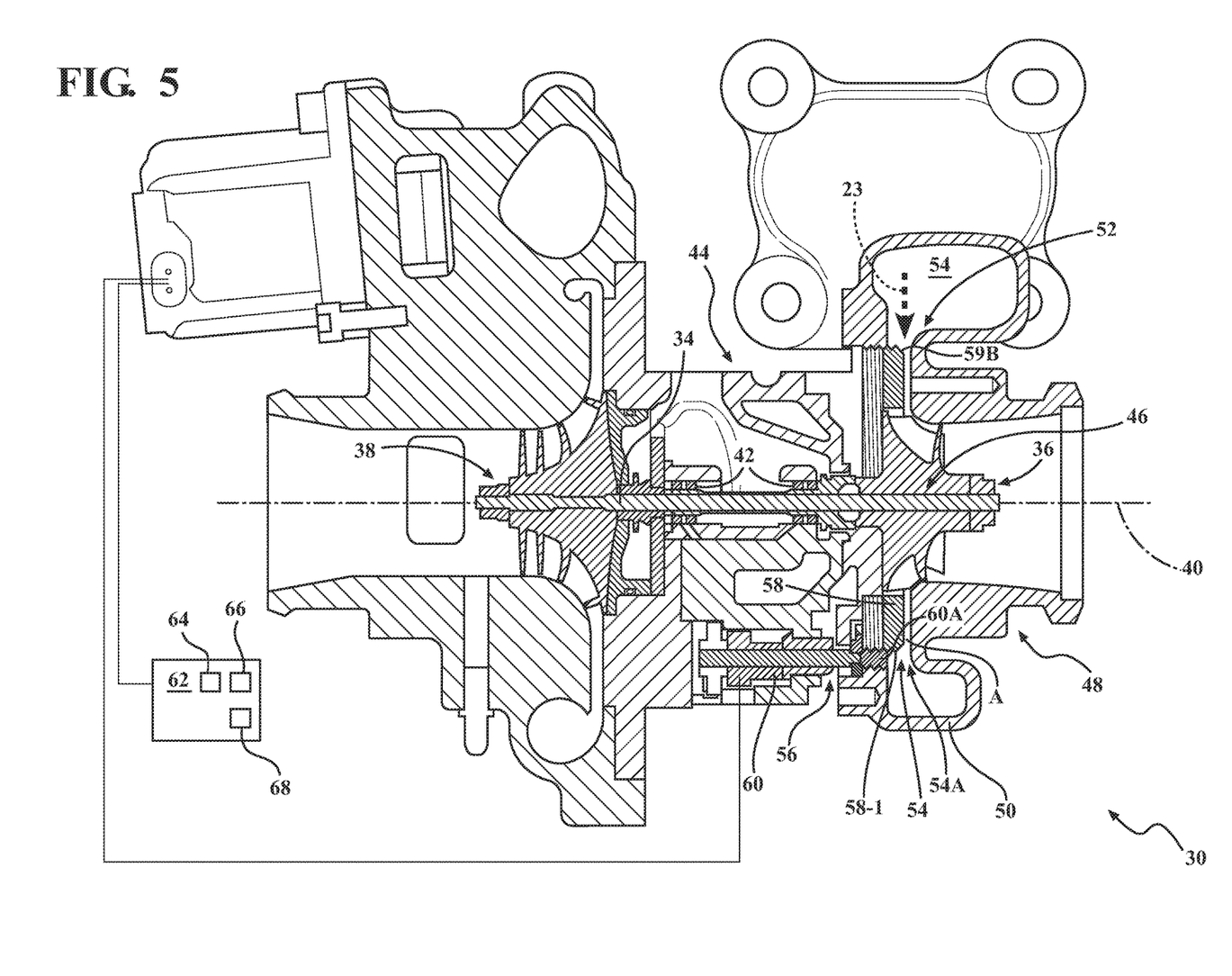
FIG. 5 is a schematic cross-sectional side view of the VGT shown in FIGS. 1 and 2, including the embodiment of the mechanism shown in FIG. 4, and depicting the ring in a fully extended position.
Figure 6:
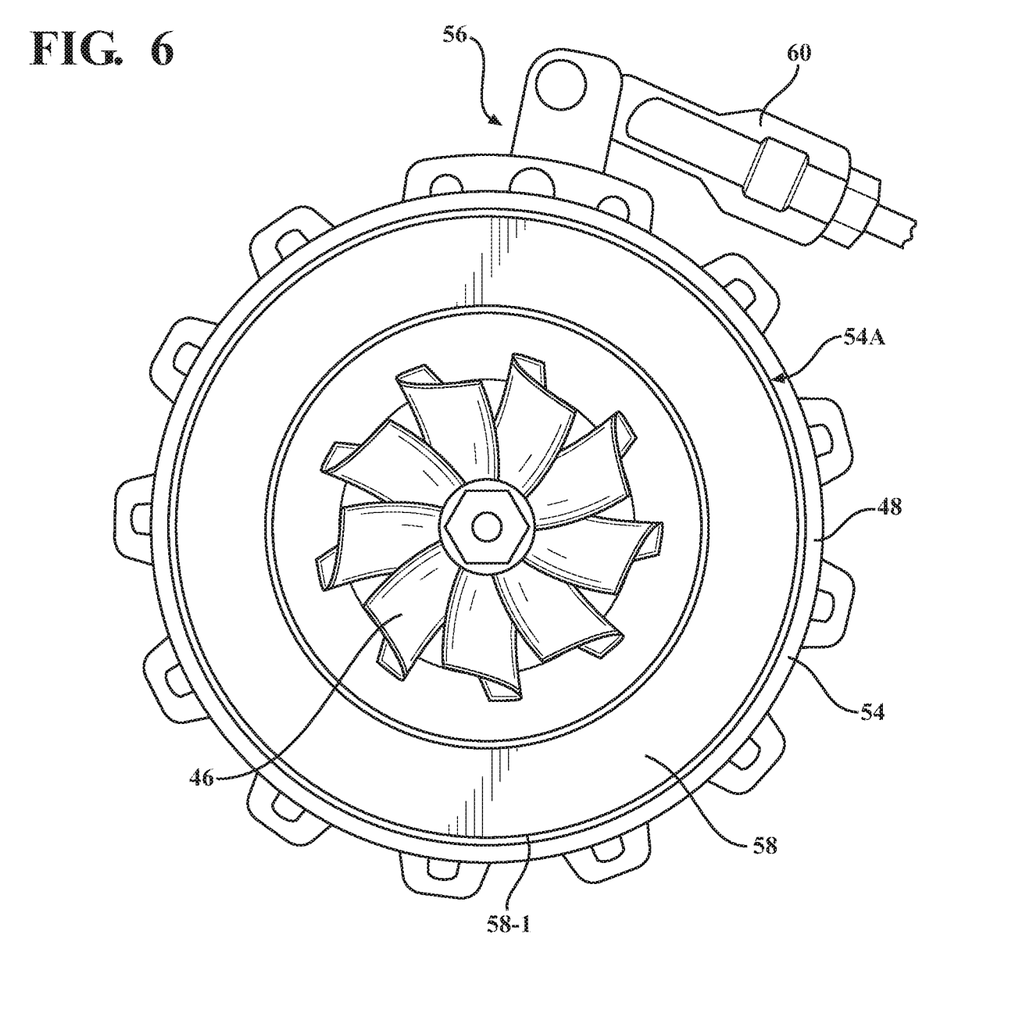
FIG. 6 is a schematic front view of the mechanism configured to select the cross-sectional area of the VGT intake channel shown in FIGS. 3 and 4.

As shown in FIGS. 3-5, the VGT 30 includes a shaft 34 having a first end 36 and a second end 38. The shaft 34 is supported for rotation about an axis 40 via bearings 42. The bearings 42 are mounted in a bearing housing 44 and may be lubricated by a supply of oil. A turbine wheel 46 is mounted on the shaft 34 proximate to the first end 36 and configured to be rotated about the axis 40 by post-combustion gases 23 emitted from the cylinders 14. The turbine wheel 46 is retained inside a turbine housing 48 that includes a volute or scroll 50. The scroll 50 defines an inlet 52 to the turbine wheel 46. As shown, the inlet 52 is positioned downstream of the volute 50 and upstream of the turbine wheel 46. The scroll 50 receives the post-combustion exhaust gases 23 and directs the exhaust gases to the turbine wheel 46 through the inlet 52. As a result, the turbine wheel 46 and the shaft 34 are rotated by post-combustion gases 23 about the axis 40. The scroll 50 is configured to achieve specific performance characteristics, such as efficiency and response, of the turbocharger 30.

The inlet 52 includes a circumferentially continuous and unobstructed variable-geometry intake channel 54. The term "circumferentially continuous and unobstructed" as specifically defined herein denotes that the intake channel 54 provides a circumferentially open path to the flow of post-combustion gases 23 between the volute 50 and the turbine wheel 46 without any obstruction around the intake channel's outer circumference 54A that would break up or divide the intake channel into individual radial passages. The circumferentially continuous and unobstructed variable-geometry intake channel 54 is specifically contrasted with such VGT configurations that include discrete vanes or other devices for radially directing exhaust gas flow through the turbine housing 48 and toward the turbine wheel 46.

According to the present disclosure, the intake channel 54 has a variable or selectable cross-sectional area A for controlled passage of the flow of post-combustion gases 23. The selectable cross-sectional area A of the intake channel 54 is configured to alter the aspect ratio of the intake channel 54 and regulate effective expansion ratio (E:R) of the turbocharger in line with the speed of the ICE 10, and thus facilitate increased ICE operating efficiency. The expansion ratio of the VGT 30 is typically defined as the ratio of the pressure of a given mass flow rate of the post-combustion gases 23 pre-turbine wheel 46 to the pressure of the same mass flow rate of the post-combustion gases post-turbine wheel. The variable aspect ratio parameter is generally defined as the ratio of the width of a shape to its height. Such variable aspect ratio of the intake channel 54 facilitates regulation of the flow speed of post-combustion gases 23 and pressure generated thereby to vary rotational speed of the turbine wheel 46. Typically, if the aspect ratio is too large, the turbocharger will generate insufficient boost and exhibit response lag at lower engine speeds. On the other hand, if the aspect ratio is too small, the turbocharger will choke the engine at higher speeds, generate high exhaust manifold pressures, high pumping losses, and ultimately result lower engine torque output.

By altering the geometry of the turbine housing 48 as the ICE 10 accelerates, the aspect ratio of the intake channel 54 may be maintained such that the VGT 30 generates acceptable response and boost at low engine speeds and sufficient airflow and boost at higher engine speeds. Overall, the variable geometry intake channel 54 defines an open path around the entire outer circumference 54A and is characterized by an absence of any radially positioned obstruction therein, while still having a variable, i.e., selectable, cross-sectional area A and selectable aspect ratio of the inlet to the turbine wheel 46.

As shown, the VGT 30 includes a mechanism 56 configured to select the cross-sectional area A of the intake channel 54. The mechanism 56 may include a ring 58 moveably mounted to the turbine housing 48 in the intake channel 54. The ring 58 defines a moveable back wall of the intake channel 54 and is configured to slide along the rotating axis 40 to thereby regulate the cross-sectional area A of the intake channel. When viewed along the rotational axis 40, the ring 58 is translatably mounted between the bearing housing 44 and the turbine wheel 46. The mechanism 56 may be configured to vary the position of the ring 58 in a continuous, i.e., step-less motion. It should be noted that the specific configurations of the mechanism 56 shown in FIGS. 3-5 are used primarily for representative purposes, and are not limiting with respect to the use of other suitable mechanisms.

The mechanism 56 may be configured such that the ring 58 has an infinite number of positions within a prescribed range R of motion relative to the axis 40. Accordingly, the entire prescribed range R of motion of the ring 58 is selected such that at least some of the flow of post-combustion gases 23 will pass through the intake channel 54 during operation of the VGT 30. Materials of the turbine housing 48 and the ring 58 may be specifically selected to have comparable coefficients of thermal expansion in order to reduce the likelihood of interference and sticking between the two components during VGT 30 operation at typical exhaust gas temperatures of the ICE 10. The mechanism 56 using the moveable ring 58 is intended to provide a robust and reliable VGT that may withstand not only the exhaust gas temperatures typically generated by diesel ICEs, but also the comparatively higher exhaust gas temperatures frequently generated by spark-ignition ICEs.

The ring 58 includes an outer diameter surface 58-1 for engagement with and sealing to the turbine housing 48. In one embodiment, the ring 58 may be substantially sealed to the turbine housing 48 along an internal cylindrical wall 48-1 configured as a guide channel 59A via a precision fit (shown in FIG. 3). Specifically, the outer diameter surface 58-1 may have a controlled clearance to an outer diameter of internal cylindrical wall 48-1 sufficient to permit sliding motion of the ring 58 relative to the turbine housing 48. Alternatively, the mechanism 56 may have a threaded interface 59B or spiral engagement with the turbine housing 48 (shown in FIGS. 4 and 5) effective in sealing the ring 58 to the turbine housing 48. In such an embodiment, the outer diameter surface 58-1 of the ring 58 may be in threaded engagement with the turbine housing 48 and configured to simultaneously rotate and translate relative to the turbine housing to thereby select the cross-section area A of the intake channel 54. The above sealing arrangements may limit pressure losses of the post-combustion gases 23 entering the inlet channel 54 and maintain operating efficiency of the VGT 30. As shown in FIG. 3, the volute 50 includes an internal cylindrical wall 50-1 defined by an outer diameter. As also shown in FIG. 3, the outer diameter surface 58-1 may substantially match the outer diameter of the internal cylindrical wall 50-1 to limit the pressure drop in the flow of post-combustion gases 23. The above configuration, where the internal cylindrical wall 48-1 and the outer diameter surface 58-1 are on a substantially matching diameter, may be included in each of the embodiments shown in FIGS. 3-5.

The outer diameter surface 58-1 of the ring 58 may have either a rounded edge 59A (shown in FIG. 3) or a beveled edge 59B (shown in FIGS. 4 and 5). Such a rounded edge 59A or beveled edge 59B on the outer diameter surface 58-1 is configured to receive the flow of post-combustion gases 23 from the volute 50 and reduce turbulence in the flow of post-combustion gases. The mechanism 56 may additionally include an actuator 60 configured to selectively and continuously vary the position of the ring 58 relative to the turbine housing 48. The actuator 60 may have either an electro-mechanical, such as an electric motor in conjunction with a gear or lever drive arrangement, or a pneumatic configuration. Additionally, the embodiment of the actuator 60 shown in FIGS. 4 and 5 may include a worm wheel 60A. The worm wheel 60A may be turned, for example, by an electric motor, and thus configured to simultaneously rotate the ring 58 within the turbine housing 48 about the axis 40 and simultaneously translate the ring along the axis within the prescribed motion range R.

As shown in FIG. 3, the mechanism 56 may additionally include a controller 62. The controller 62 may be a central processing unit (CPU) configured to regulate various functions on the vehicle 6 or a dedicated electronic control unit (ECU) for controlling operation of the ICE 10. In either configuration, the controller 60 includes a processor 64 and tangible, non-transitory memory 66 that includes instructions for the actuator 60 programmed therein. As such, in the controller 60, the processor 64 is configured to execute the instructions from the memory 66 to regulate the ICE 10, including the operation of the actuator 60. Furthermore, the controller 62 may be configured to regulate the actuator 60 according to a programmed algorithm 68 reflecting various operating modes of the VGT 30 specifically configured to support operation of the ICE 10.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A variable-geometry turbocharger (VGT) for an internal combustion engine configured to generate a flow of post-combustion gases as a byproduct of generating output torque, the VGT comprising:
a turbine housing defining a volute; and
a turbine wheel mounted on a shaft having a rotational axis, retained inside the turbine housing, and configured to be rotated about the rotational axis by the flow of post-combustion gases;
wherein:
the turbine housing defines an inlet to the turbine wheel downstream of the volute and upstream of the turbine wheel; and
the inlet to the turbine wheel includes a circumferentially continuous and unobstructed intake channel having a selectable cross-sectional area and configured to regulate an expansion ratio of the VGT; and
a mechanism configured to select the cross-sectional area of the intake channel;
wherein:
the mechanism includes a ring defined by an outer diameter surface and moveably mounted to the turbine housing in the intake channel; and
the ring is in threaded engagement with the turbine housing and configured to simultaneously rotate and translate relative to the turbine housing to thereby select the cross-sectional area of the intake channel.

2. The VGT of claim 1, further comprising a bearing housing including at least one bearing configured to support the shaft, and the ring is defined by an outer diameter surface and is mounted between the bearing housing and the turbine wheel.

3. The VGT of claim 1, wherein the outer diameter surface of the ring has one of a rounded and a beveled edge configured to receive the flow of post-combustion gases from the volute and reduce turbulence in the flow of post-combustion gases.

4. The VGT of claim 1, wherein the volute of the turbine housing includes an internal cylindrical wall defined by a diameter, and wherein the outer diameter of the surface matches the diameter of the internal cylindrical wall.

5. The VGT of claim 1, wherein the mechanism additionally includes an actuator configured to selectively vary a position of the ring relative to the turbine housing.

6. The VGT of claim 5, wherein the actuator is configured to vary the position of the ring in a continuous and step-less motion.

7. The VGT of claim 5, wherein the mechanism additionally includes a controller having a memory and configured to regulate the actuator.

8. An internal combustion engine comprising:
a cylinder configured to receive an air-fuel mixture for combustion therein;
a reciprocating piston disposed inside the cylinder and configured to generate a flow of post-combustion gases from the cylinder; and
a variable geometry turbocharger (VGT) including:
  a turbine housing defining a volute; and
  a turbine wheel mounted on a shaft having a rotational axis, retained inside the turbine housing, and configured to be rotated about the rotational axis by the flow of post-combustion gases;
  wherein:
    the turbine housing defines an inlet to the turbine wheel downstream of the volute and upstream of the turbine wheel; and
    the inlet to the turbine wheel includes a circumferentially continuous and unobstructed intake channel having a selectable cross-sectional area and configured to regulate effective expansion ratio of the VGT; and
  a mechanism configured to select the cross-sectional area of the intake channel;
    where:
      the mechanism includes a ring defined by an outer diameter surface and moveably mounted to the turbine housing in the intake channel; and
      the ring is in threaded engagement with the turbine housing and configured to simultaneously rotate and translate relative to the turbine housing to thereby select the cross-sectional area of the intake channel.

9. The internal combustion engine of claim 8, wherein the VGT additionally includes a bearing housing including at least one bearing configured to support the shaft, and the ring is mounted between the bearing housing and the turbine wheel.

10. The internal combustion engine of claim 8, wherein the outer diameter surface of the ring has one of a rounded and a beveled edge configured to receive the flow of post-combustion gases from the volute and reduce turbulence in the flow of post-combustion gases.

11. The internal combustion engine of claim 8, wherein the volute of the turbine housing includes an internal cylindrical wall defined by a diameter, and wherein the outer diameter of the surface matches the diameter of the internal cylindrical wall.

12. The internal combustion engine of claim 8, wherein the mechanism additionally includes an actuator configured to selectively vary a position of the ring relative to the turbine housing.

13. The internal combustion engine of claim 12, wherein the actuator is configured to vary the position of the ring in a continuous and step-less motion.

14. The internal combustion engine of claim 12, wherein the mechanism additionally includes a controller having a memory and configured to regulate the actuator.

* * * * *